Patented Sept. 6, 1949

2,481,158

UNITED STATES PATENT OFFICE 2,481,158

PRODUCTION OF POLYHALO-ALKANES

Louis Schmerling, Riverside, Ill., assignor to Universal Oil Products Company, Chicago, Ill., a corporation of Delaware No Drawing. Application August 30, 1945,
Serial No. 613,707

22 Claims. (Cl. 260—658)

This application is a continuation-in-part of my copending application Serial No. 465,097 filed November 9, 1942, and of my copending application Serial No. 496,792 filed July 30, 1943, as a continuation-in-part of application Serial No. 465,097, both of which applications are now abandoned.

This invention relates to the condensation of a monohalo-alkane containing at least 3 carbon atoms per molecule and a halogen of at least 35 atomic weight with a halomono-olefin containing a halogen of at least 35 atomic weight.

By the term "condensation" used in this specification and in the claims, I mean the chemical combination of the aforementioned monohalo-alkane and halomono-olefin to produce a higher boiling polyhalo-alkane with a molecular weight equal to the sum of the molecular weights of the monohalo-alkane and the halomono-olefin.

An object of this invention is to produce a halo-alkane containing at least 2 hagolen atoms per molecule.

Another object of this invention is to produce a dihalo-alkane by condensing a monohalo-alkane having at least 3 carbon atoms per molecule and a monohalomono-olefin, the halogen present in each of the starting materials having an atomic weight of at least 35.

Still another object of this invention is the production of a dichloro-alkane by condensing a monochloro-mono-olefin and a monochloro-alkane having at least 3 carbon atoms per molecule.

A further object of this invention is to condense a monohalo-alkane having at least 3 carbon atoms per molecule and a polyhalomono-olefin to form a polyhalo-alkane containing per molecule the total number of halogen atoms present in a molecule of each of said monohalo-alkane and said polyhalomono-olefin in each of which the halogen has an atomic weight of at least 35.

A still further object of this invention is the production of a trichloro-alkane by the condensation of a monochloro-alkane and a dichloro-alkene in the presence of a catalyst of the Friedel-Crafts type.

One specific embodiment of the present invention relates to a process which comprises condensing a monohalo-alkane containing at least 3 carbon atoms per molecule and a halogen of an atomic weight of at least 35 with a halomono-olefin also containing a halogen of atomic weight of at least 35 in the presence of a Friedel-Crafts metal halide catalyst.

Another embodiment of this invention relates to a process which comprises condensing a monohalo-alkane containing at least 3 carbon atoms per molecule and a halogen of an atomic weight of at least 35 with a halomono-olefin also containing a halogen of atomic weight of at least 35 in the presence of a compound of aluminum and a middle halogen, thus including aluminum chloride and aluminum bromide.

Monohalo-alkanes also known as alkyl halides which are employed as starting material in the present process may be produced by the addition of a hydrogen halide to monoolefinic hydrocarbons. This addition reaction of hydrogen halide to an olefin may be effected in the presence of a catalyst such as a Friedel-Crafts type metal halide, an acid such as sulfuric acid or an acid of phosphorus, etc. Such an addition of hydrogen halide to an olefin results in the production of secondary alkyl halides from normal olefins and other non-tertiary olefins containing 3 or more carbon atoms per molecule and in the formation of teriary alkyl halides from tertiary olefins such as isobutylene, trimethyl ethylene, etc. Primary alkyl halides also utilizable in the present process for producing polyhalo-alkanes are obtainable by other means such as the treatment of a primary alcohol having at least 3 carbon atoms per molecule with a hydrogen halide in the presence of a suitable catalyst such as zinc chloride. Secondary and tertiary alcohols also react with hydrogen halides to produce alkyl halides. Primary alkyl bromides may be obtained from a 1-alkene, also known as an alpha-olefin, by addition of hydrogen bromide to the 1-alkene in the presence of organic peroxides.

I prefer to condense alkyl chlorides and alkyl bromides having at least 3 carbon atoms per molecule with halomono-olefins, although alkyl iodides are also utilizable but not necessarily under exactly the same conditions of operation.

Halomono-olefins which are condensed with the aforementioned alkyl halides or monohalo-alkanes according to the process of this invention contain one double bond and at least one halogen atom per molecule. The halogens present in both the halomono-olefins and monohalo-alkanes have atomic weights of at least 35, thus including the middle halogens chlorine and bromine, and also iodine which is the halogen of highest atomic weight. Monohalomono-olefins utilizable in the present process comprise monohalo-ethenes, -propenes, -butenes, -pentenes, and higher halo-alkenes. Vinyl chloride, allyl chloride, allyl bromide, propenyl chloride, and isopropenyl chloride are representative of halo-olefins containing one halogen atom and one double bond per molecule and suitable for use in the present process.

Polyhalomono-olefins which are condensed with monohalo-alkanes according to my process include 1,2-dichloroethylene, 1,2-dichloropropene-1, 1,2-dichloropropene-2, and trichloroethylene.

Halo-olefins may be formed in any suitable manner such as by the action of a halogen upon an olefin at a temperature at which substitution occurs and substantially in excess of that at which addition of a halogen to the olefinic double bond is the principal reaction. Monohaloolefines may also be prepared by the addition of a halogen to an olefin to form a dihalo-alkane from which one molecule of hydrogen halide may be removed by any of several well known methods to produce a halo-olefin. Furthermore, halo-olefins may be prepared by addition of hydrogen halide to acetylenes. Polyhaloolefins may be prepared by the addition of halogen to acetylenes.

Suitable catalysts for the process of the present invention comprise metal halides of the Friedel-Crafts type and particularly substantially anhydrous compounds of aluminum with a middle halogen thus including aluminum chloride and aluminum bromide. Ferric chloride, bismuth chloride, zinc chloride, zirconium chloride, and titanium chloride are also utilizable as catalysts for the condensation of monohalo-alkanes with halomono-olefins. The conditions of operation utilizable with the different Friedel-Crafts type metal halides or with metal halide mixtures may be different depending upon catalyst activities and other factors. These different catalytic materials which may be employed are utilizable as such, composited with one another, dissolved in a suitable solvent such as a nitro-paraffin or an ether, or deposited on solid carriers or supporting materials to produce catalyst composites of desired activities. They may also be employed in the form of complexes with organic compounds; for example $AlCl_3 \cdot CH_3OH$.

Suitable catalyst carriers or supports include both adsorptive and substantially non-adsorptive materials, for example, alumina, activated charcoal, crushed porcelain, raw and acid-treated clays, diatomaceous earth, pumice, firebrick, etc. The carriers should be substantially inert in the sense that substantially no interaction which is detrimental to the activity or selectivity of the catalyst composite occurs between the carrier and the metal halide.

Although the process of the present invention is not understood completely, it appears to involve the addition to a halomono-olefin of an alkyl halide containing at least 3 carbon atoms per molecule, the halogen of said alkyl halide and halomono-olefin having an atomic weight of at least 35. Thus, the reaction of such a monohalo-alkane with such a monohalomono-olefin produces a dihalo-alkane with a molecular weight equal to the sum of the molecular weights of the two reactants. For example, the condensation of tertiary butyl chloride with vinyl chloride produces 1,1-dichloro-3,3-dimethylbutane, which is a dichloroneohexane. This reaction is illustrated by the following equation:

$$(CH_3)_3CCl + H_2C=CHCl \rightarrow (CH_3)_3CCH_2CHCl_2$$

The dichlorohexane indicated in the preceding equation may be converted into neohexane, tertiary butyl acetaldehyde, or other desirable compounds. The process of this invention thus teaches a simple method for preparing a compound containing a quaternary carbon atom. A dichlorohexane of the type indicated above may also be converted into a chlorohexene by removal of a molecular proportion of hydrogen chloride.

The condensation of a tertiary monohalo-alkane with a monohalomono-olefin having a vinyl group may be expressed by the following equation:

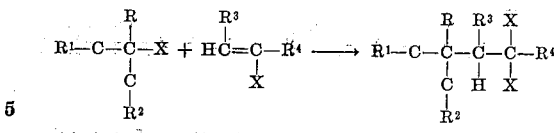

wherein X represents a halogen atom with an atomic weight of at least 35, R represents an alkyl group, and $R^1$, $R^2$, $R^3$, and $R^4$, represent hydrogen atoms or alkyl groups. The resultant dihalo-alkanes may be referred to as X, X-dihalo-(X+2), (X+2)-di-(alkyl)-alkanes wherein X is an integer. Thus, when X is 1, the dihaloalkane is a 1,1-dihalo-3,3-di-(alkyl)-alkane as 1,1-dichloro-3,3-dimethylbutane. When X is 2, the dihaloalkane is a 2,2-dihalo-4,4-di-(alkyl)-alkane as 2,2-dichloro-4,4-dimethylpentane or 2,2-dichloro-4,4-dimethylhexane.

Also, I have found that cis-dichloroethylene may be made to react with tertiary butyl chloride in the presence of aluminum chloride to obtain a trichlorohexane, namely 1,1,2-trichloro-3,3-dimethylbutane. This condensation reaction is illustrated by the following equation:

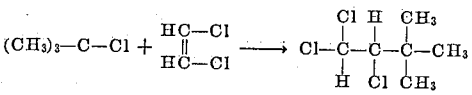

The production of polyhalo-alkanes as herein set forth is carried out by reacting an alkyl halide and a polyhalo-olefin in the presence of a catalyst of the Friedel-Crafts type at a temperature of from about −40° to about 100° C., generally while maintaining the reaction mixture at a pressure sufficient to keep a substantial portion thereof in the liquid state. The reactions of different alkyl halides or monohalo-alkanes with different halomono-olefins are not necessarily carried out with equal ease or under the same conditions of operation. When employing aluminum chloride as catalyst, the lower operating temperatures within the above-indicated limits are generally preferred since this metal halide has a relatively high activity, particularly in the presence of a hydrogen halide, such as hydrogen chloride or hydrogen bromide, sometimes used simultaneously with a Friedel-Crafts type metal halide. Ferric chloride, and zirconium chloride are generally utilized at somewhat higher temperatures (about −10° to about 40° C.) than that employed when aluminum chloride is the essential active ingredient of the catalyst. The higher operating temperatures (about 20° to about 100° C.) are sometimes used when employing a less active catalyst such as bismuth chloride or zinc chloride.

The reaction of a monohalo-alkane having at least 3 carbon atoms per molecule and containing a halogen of at least 35 atomic weight with a halomono-olefin may be carried out in the presence of a catalyst of the Friedel-Crafts type by using either batch or continuous operation. In batch type treatment, desired proportions of the mentioned monohalo-alkane and halomono-olefin are introduced to a suitable reactor containing a catalyst of the Friedel-Crafts type, either as such, composited with a carrier, or dissolved in a solvent; and the resultant commingled materials are contacted until a substantial proportion of the reactants are converted into the desired high molecular weight polyhaloalkane. The reaction mixture after separation from the catalyst is fractionally distilled to separate the unconverted monohalo-alkane and halomono-olefin from higher boiling polyhalo-alkanes. The mixture of recovered monohalo-alkane and halomono-olefin may be used in another run to produce an additional quantity of desired polyhaloalkane.

Continuous operation may be carried out by conducting a mixture of a monohalo-alkane (also spoken of as an alkyl halide) and a halomonoolefin through a reactor of suitable design containing a stationary bed of catalyst of the Friedel-Crafts type. In this type of treatment, the operating conditions may be adjusted suitably, and may differ somewhat from those employed in batch type operation. Thus when a mixture of an alkyl halide and a polyhalo-olefin is passed, for example, through a tubular reactor containing aluminum chloride, bismuth chloride, ferric chloride, etc. supported by granular porcelain, the formation of the desired higher boiling polyhaloalkanes may be effected by using a higher temperature and shorter contact time than when contacting a similar mixture and catalyst at a lower temperature in a batch type reactor, such as an autoclave provided with suitable stirring or agitating means.

In some cases it may be advisable to commingle the charged monohalo-alkane and halomono-olefin with a substantially inert solvent such as a paraffinic hydrocarbon, for example, normal pentane, and then to effect condensation in the presence of this added solvent. Obviously the solvent chosen should be one which does not itself undergo undesirable reaction with the other components of the reaction mixture under the operating conditions used.

The following examples are given to illustrate the character and results obtained by the use of specific embodiments of the present process, although the data presented are not introduced with the intention of unduly restricting the generally broad scope of the invention.

EXAMPLE I

A mixture of 65 grams of tertiary butyl chloride, 42 grams of vinyl chloride, and 5 grams of anhydrous bismuth chloride were charged to a glass-lined rotatable steel autoclave of 850 cc. capacity to which nitrogen was added to a pressure of 50 atmospheres at room temperature. The autoclave was then rotated and heated at 90° C. for four hours. After the autoclave had cooled to room temperature, the reaction product was removed and separated into 20 grams of unconverted vinyl chloride, 72 grams of liquid product and 8 grams of a reddish brown tar. Distillation of the liquid product under 12 mm. pressure removed unconverted tertiary butyl chloride and separated 15 grams of a compound which boiled mainly at 37–39° C. under 12.5 mm. mercury pressure (148–150° C. at 760 mm. pressure), had a refractive index of 1.4381 at 20° C., a density of 1.0031 at 20° C., and a melting point between −64 and −62° C. This reaction product was 1,1-dichloro-3,3-dimethylbutane.

EXAMPLE II 47 grams of tertiary butyl chloride, 48 grams of 2-chloropropene, and 5 grams of bismuth chloride were charged to the glass-lined autoclave employed in Example I. Nitrogen was then added to the autoclave to give an initial pressure of 50 atmospheres, and the autoclave was then heated at 50° C. for 4 hours. After the autoclave had cooled and the gases had been discharged, there remained 89 grams of liquid product and 8 grams of a reddish brown tar containing the used catalyst. Distillation of the liquid product under reduced pressure separated this material into the fractions shown in Table 1.

TABLE 1

*Product from reaction of tertiary butyl chloride with 2-chloropropene in the presence of bismuth chloride*

| Fraction | B. P., °C. | Press. mm. | B. P. at 760 mm. | Vol., cc. | $n_D^{20}$ | $d_4^{20}$ |
|---|---|---|---|---|---|---|
| 0 | 20 | 100 | 75 | 52 | | |
| 1 | 20–40 | 100 | 75–95 | 2.0 | 1.4190 | |
| 2 | 40–40 | 37 | 124–124 | 10.0 | 1.4302 | 0.8814 |
| 3 | 40–32 | 37–10.5 | 124–144 | 8.5 | 1.4324 | 0.8865 |
| 4 | 32–32 | 10.5 | 144–144 | 3.3 | 1.4373 | 0.9218 |
| 5 | 45–49 | 10.5 | 160–164 | 8.7 | 1.4461 | 1.0115 |
| Bottoms | | | | 6.5 | | |

As shown in the above table, the distillation curve of the reaction product showed 3 plateaus at reduced pressures corresponding to the temperatures of 124, 144, and 164° and 760 mm. pressure. The compound boiling at 164° C. was probably the dichloroheptane while that boiling at 124° C. was apparently a chloroheptane resulting from elimination of 1 molecular proportion of hydrogen chloride from 1 molecular proportion of the dichloroheptane.

EXAMPLE III 50 grams of tertiary butyl chloride, 50 grams of allyl chloride, and 5 grams of bismuth chloride were introduced to the glass-lined autoclave employed in Examples I and II, placed under 50 atmospheres nitrogen pressure, and rotated and heated at 60° C. for four hours. After the autoclave had cooled to room temperature, 91 grams of liquid product, 8 grams of used catalyst, and 2 grams of condensible gas were removed therefrom. Distillation of the liquid product under reduced pressure separated it into fractions with the properties shown in Table 2.

TABLE 2

*Product from condensation of tertiary butyl chloride with allyl chloride in the presence of bismuth chloride*

| Fraction | B. P., °C. | Press. mm. | B. P. at 760 mm. | Vol., cc. | $n_D^{20}$ |
|---|---|---|---|---|---|
| 0 | 36 | 465 | 46 | 26 | |
| 1 | 36–40 | 465 | 46–50 | 60 | |
| 2 | 25–61 | 225 | 50–93 | 0.1 | |
| 3 | 40–45 | 5 | 171–176 | 4.0 | 1.4440 |
| 4 | 45–49 | 5 | 176–180 | 2.3 | 1.4461 |
| 5 | 49–52 | 5 | 180–183 | 1.6 | 1.4497 |
| 6 | 52–70 | 5 | 183–206 | 1.7 | 1.4568 |

The addition of tertiary butyl chloride to allyl chloride in the presence of bismuth chloride took place less readily than addition of tertiary butyl chloride to vinyl chloride or to 2-chloropropene. With the present reactants, very little condensation occurred at temperatures below 50° C. but at 60° C., a rather small yield was obtained of a compound boiling mainly between 42 and 47° C. under 5 mm. mercury pressure (172–178° at 760 mm.). The physical properties of this substance indicated that it was a dichloroheptane.

EXAMPLE IV

Good yields of a chlorobromoparaffin were obtained with a mixture of tertiary butyl bromide and vinyl chloride was heated with bismuth chloride at 50° and 65° C. under 50 atmospheres initial nitrogen pressure in runs 4 and 5 shown in Table 3.

TABLE 3

*Condensation of tertiary butyl bromide with vinyl chloride*

| Run No | 4 | 5 | 6 |
|---|---|---|---|
| Temperature, °C | 50 | 65 | a |
| Catalyst, grams: | | | |
| Bismuth chloride | 5 | 5 | |
| Ferric chloride | | | 5 |
| Charge, grams: | | | |
| Tertiary butyl bromide | 42 | 80 | 80 |
| Vinyl chloride | 21 | 56 | 40 |
| Chief product, chlorobromohexane: | | | |
| Grams | 20 | 21 | 82 |
| Boiling point, °C | 161–63 | 160–64 | 161–63 |

*a. Below room temperature, reactants precooled to −78° C. before mixing.*

A practically quantitative yield of chlorobromohexane was obtained with ferric chloride in Run No. 6 at a temperature considerably below room temperature when the reaction was carried out under atmospheric pressure with a minimum of mixing in a glass-lined cylindrical reactor. In this run, 80 grams of tertiary butyl bromide was cooled to −78° C. and 5 grams of ferric chloride were added thereto producing a deep red colored solution. Vinyl chloride was cooled to −78° C. and then gradually poured into the cooled tertiary butyl bromide-ferric chloride mixture. This addition of vinyl chloride caused an immediate reaction so that the reaction mixture had the apperance of boiling. After all of the vinyl chloride had been added, the reaction mixture was allowed to warm to room temperature and then to stand for 4 hours during which time no gases were evolved. The final product consisted of a clear red upper layer and a wet catalyst powder. Distillation of the upper layer showed that over 85% consisted of a chlorobromohexane which was 1-chloro-1-bromo-3,3-dimethylbutane. This material may therefore be classed as a dihaloneohexane. The chlorobromo dimethylbutane so obtained boils at 65–67° C. under 25 mm. pressure (161–63° at 760 mm.), has a refractive index of 1.4640 at 20° C., and a density of 1.2638 at 20° C.

Treatment of the compound with aqueous potassium hydroxide at 200° C. in a sealed tube yielded an aldehyde boiling at 104–105° C. which was identified as tertiary butyl acetaldehyde. Accordingly, the chlorobromide obtained from reaction of tertiary butyl bromide with vinyl chloride is 1-chloro-1-bromo-3,3-dimethylbutane.

EXAMPLE V

Using the autoclave and procedure employed in Example I, but with ferric chloride as catalyst instead of bismuth chloride, the condensation of tertiary butyl chloride with vinyl chloride proceeded practically quantitatively at 25–30° C. or at a lower temperature. Thus, from 200 grams of tertiary butyl chloride and 110 grams of vinyl chloride was obtained 277 grams of a washed liquid product which contained 75% by weight of a compound boiling at 57° C. under 30 mm. pressure or at 148° C. under atmospheric pressure. This yield of liquid product represents 77% of the theoretical yield of dichlorohexane based upon the vinyl chloride charged.

EXAMPLE VI

About 9 grams of a dichloroparaffin boiling chiefly at 183–187° C. was obtained when 50 grams of tertiary butyl chloride and 50 grams of methallyl chloride were reacted at 40° C. for 4 hours in the presence of 6 grams of bismuth chloride under an initial pressure of 50 atmospheres. Most of the starting materials were recovered unchanged from the reaction mixture.

EXAMPLE VII 50 grams of tertiary butyl chloride, 45 grams of 2-chloropropene, and 11 grams of titanium tetrachloride were introduced to an autoclave to which nitrogen was added to 50 atmospheres initial pressure and the resultant mixture was rotated and heated for 4 hours at 50° C. After the autoclave had cooled, the reaction product was removed therefrom, washed with caustic soda solution and water, dried and fractionally distilled. The chief products were 2,2-dichloropropane and a saturated compound, probably a monochloroalkane, boiling at 186° to 188° C. and melting between −36° and −34° C. The desired dichloroheptane, 2,2 - dichloro-4,4-dimethylpentane, was also obtained but in low yield.

The same products were obtained from tertiary butyl chloride and 2-chloropropene at room temperature (27° C.) in the presence of ferric chloride, the chief difference being that a substantial yield of a dichloroheptane was obtained along with 2,2-dichloropropane and the compound boiling at 186–188° C.

EXAMPLE VIII

A mixture of 93 grams of tertiary butyl chloride and 76 grams of 2-chloropropene was placed in a large test tube, cooled to −50° C. and then mixed with 2 grams of anhydrous aluminum chloride. The reaction mixture was permitted to warm up spontaneously until the temperature reached −17° C. at which time the catalyst was a reddish orange colored gummy mass. Because of the fact that gas began to be evolved, the mixture was cooled to −25° C. and then permitted to warm to about −12° C. at which evolution of gas occurred. The mixture was then cooled to −20° C. Such intermittent warming and cooling of the reaction mixture was repeated several times during the first 3 to 5 minutes after adding the aluminum chloride, and the temperature was kept between about −8° and +8° C. for 30 minutes more after which the catalyst had the appearance of a red liquid from which the upper layer of reaction products was decanted, washed, and dried. Distillation of the 148 cc. of liquid reaction product separated this material into the fractions shown in Table 4.

TABLE 4

*Product from condensation of tertiary butyl chloride with 2-chloropropene in the presence of aluminum chloride*

| Fraction | B. P., °C. | Press., mm. | B. P. at 760 mm. | Vol., cc. | $n_D^{20}$ |
|---|---|---|---|---|---|
| 1 | 100 | 740 | | 32 | |
| 2 | 60–60.5 | 22 | 159–160 | 10 | 1.4470 |
| 3 | 60–60 | 21 | 160–160 | 14 | 1.4480 |
| 4 | 59.5–58 | 20–19 | 160–160 | 50 | 1.4480 |
| 5 | 57.5–57.5 | 18–18 | 160–162 | 7.5 | 1.4484 |
| 6 | 46–95 | 7.5 | 168–228 | 4.8 | 1.4589 |
| 7 | 95–108 | 7 | 228–248 | 7.3 | 1.4747 |
| 8 | 108–108 | 7 | 248–248 | 10.0 | 1.4814 |
| 9 | 108–109 | 7 | 248–250 | 3.5 | 1.4849 |
| Residue | | | | 8 | |

The material boiling at 160° C. (Fractions 3 and 4) was 2,2-dichloro-4,4-dimethylpentane, a new compound. This structure was shown by hydrolysis to methyl neopentyl ketone which boiled at 120–124° C., yielding a semicarbazone melting at 176° C., and a 2,4-dinitrophenylhydrazone melting at 100° C. in agreement with the values reported in the literature for these derivatives of methyl neopentyl ketone.

EXAMPLE IX

Reaction of tertiary butyl chloride with 1-chloropropene took place more slowly than with other chloro-olefins. Thus from about 2 to about 5% by weight of dichloroheptane was obtained after mixtures of 1-chloropropene and tertiary butyl chloride were treated for 4 hours at 50° or 90° C. in the presence of bismuth chloride. With ferric chloride as catalyst at 25° C. and similar contact time, the yield of dichloroheptane was only about 12%. Better results were obtained in the presence of aluminum chloride at low temperatures. Thus the addition of 2 grams of this catalyst at −20° C. to 35 grams of a mixture of equal molecular proportions of tertiary butyl chloride and 1-chloropropene (also called propenyl chloride) gave about a 30% yield of dichloroheptane after only 5 minutes reaction time. The dichloroheptane obtained boiled between 73° and 79° C. at 22 mm. pressure (175° to 181° C. at 760 mm.), had a refractive index at 20° C. of from 1.4600 to 1.4627, and a density of 1.03.

EXAMPLE X

A mixture of 51 grams of isopropyl chloride and 40 grams of vinyl chloride was cooled in a large test tube to a temperature of −70° C. and 2 grams of aluminum chloride was added thereto. The temperature of the resultant mixture was then permitted to rise to −35° C. at which a vigorous reaction occurred and the temperature of the mixture increased to +35° C. in less than one minute even though the reaction mixture was immediately placed in a cooling mixture at −78° C. The reaction product after being separated from the catalyst was washed and a 28 cc. portion thereof was distilled into the following fractions:

| Fraction | Boiling range, °C. | Vol., cc. | $n_D^{20}$ |
|---|---|---|---|
| 1 | 36–128 | 8.6 | |
| 2 | 128–129 | 12.0 | 1.4349 |
| 3 | 129–132 | 3.2 | 1.4359 |
| Residue | | | |

The product which boiled at 128–129° C. was 1,1-dichloro-3-methylbutane which has been prepared by previous workers by treating isovaleraldehyde with phosphorus pentachloride.

EXAMPLE XI

Reaction of 78 grams of isopropyl chloride with 38 grams of vinyl chloride in the presence of 5 grams of ferric chloride in a rotatable steel autoclave at 25° C. yielded 20 grams of product boiling at 128–129° C. and having a refractive index of 1.4344 at 20° C. The product boiling at 128–129° C. was 1,1-dichloro-3-methylbutane which was also produced as described in Example X.

EXAMPLE XII

Another run was made similar to those referred to in Examples X and XI which showed that the number of carbon atoms in the monohalo-alkane is critical. A mixture of 38 grams of ethyl chloride and 37 grams of vinyl chloride was cooled to −70° C. and 3 grams of aluminum chloride was added thereto. The mixture was allowed to warm up slowly while being shaken. No change occurred up to a temperature of −3° C.; at this point the mixture began to boil (vinyl chloride boils at −18° C.) and the mixture was therefore sealed into a rotatable steel autoclave. The autoclave was rotated at room temperature for 2 hours and then at 50° C. for 2 hours. The product consisted of 7 grams of a deep red liquid, 15 grams of catalyst sludge, and 47 grams of gas condensed at −78° C. The material condensed at −78° C. consisted of a mixture of vinyl chloride and ethyl chloride. The liquid product was washed and distilled. It was shown to consist of 4 grams of 1,1-dichloroethane (B. P. 55° to 60° C.) and 3 grams of 1,1,2-trichlorobutane (B. P. 150° C.). No 1,1-dichlorobutane, i. e., the product of the condensation of ethyl chloride with vinyl chloride, according to the definition of condensation given in the specification, was obtained. The 1,1-dichloroethane was formed by the addition of hydrogen chloride to the vinyl chloride, the hydrogen chloride being formed by dehydrohalogenation of the ethyl chloride. The 1,1,2-trichlorobutane was formed by the condensation of the 1,1-dichloroethane with vinyl chloride. The following equations illustrate the reactions which occurred:

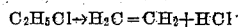

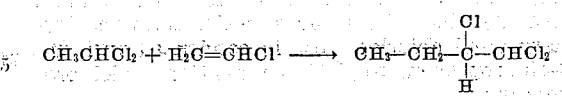

The following reaction did not occur.

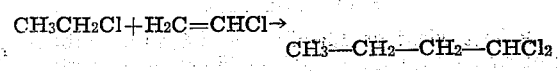

Proof that the trichlorobutane was formed by the sequence of reactions shown above was obtained by treating 70 grams of vinyl chloride with 11 grams of hydrogen chloride in the presence of 3 grams of aluminum chloride in the autoclave at room temperature for 2 hours, and at 50° C. for 2 hours more. There was obtained besides unreacted vinyl chloride, 16 grams of 1,1-dichloroethane (B. P. 55–56° C.) and 4 grams of 1,1,2-trichlorobutane (B. P. 149 to 150° C.).

EXAMPLE XIII

A solution of 26 grams of cis-dichloroethylene and 26 grams of tertiary butyl chloride, in a cylindrical glass reactor, was cooled to −40° C. and then treated at that temperature and at atmospheric pressure with 1 gram of anhydrous aluminum chloride. The resultant mixture was then permitted to warm to about −10° C., and the reaction temperature was kept between −10° and +1° C. for 1 hour during which time the charged materials and catalyst were mixed intermittently by shaking the reactor. The reactor and its contents were then permitted to stand at room temperature for 2 hours after which the reaction product was removed from the reactor, washed with water, and distilled. In this way, 11 grams of reaction product was obtained which boiled mainly at 192° to 194° C., melted between −23° and −22° C., and had a refractive index of 1.475. The physical properties of this reaction product are those expected for a trichlorohexane. Also, trichlorohexane was obtained, but in much lower yield, when transdichloroethylene was reacted similarly with tertiary butyl chloride.

EXAMPLE XIV 1,2-dichloro-4,4-dimethylhexane was obtained in 23% of the theoretical yield (based upon the charge, of which about 40% was recovered unchanged) by reacting 100 grams of tertiary amyl chloride and 75 grams of allylchloride at about 0° C. in the presence of 8 grams of substantially anhydrous aluminum chloride. This reaction mixture yielded 40 grams of 1,2-dichloro-4,4-dimethylhexane boiling at 198–200° C.

EXAMPLE XV

The reaction of tertiary amyl chloride with 2-chloropropene at about −10° C. in the presence of aluminum chloride resulted in a 10% yield of 2,2-dichloro-4,4-dimethylhexane as well as a substantial amount of higher boiling product. In this run 105 grams of tertiary amyl chloride, and 75 grams of 2-chloropropene reacted in the presence of 7 grams of aluminum chloride and gave 16 grams of the mentioned dichlorooctane.

Somewhat better results were obtained when ferric chloride was used as catalyst at about 20° C. in that 40 grams of tertiary amyl chloride and 31 grams of 2-chloropropene in the presence of 4 grams of ferric chloride yielded 10 grams of 2,2-dichloro-4,4-dimethylhexane boiling at 187–190° C. Also, what appeared to be 2,2-dichloro-4,4-dimethylpentane was isolated in 5 to 10% yield. The formation of this latter compound may be explained by assuming that part of the tertiary amyl chloride was converted into tertiary butyl chloride which, being more active than the tertiary amyl chloride, readily condensed with the 2-chloropropene to yield the mentioned dichloroheptane.

EXAMPLE XVI

A 34% yield of 1,2-dibromo-4,4-dimethylhexane was obtained by reacting 75 grams of tertiary amyl bromide and 60 grams of allyl bromide at −30° C. in the presence of 5 grams of substantially anhydrous aluminum chloride. The 45 grams of 1,2-dibromo-4,4-dimethylhexane so obtained boiled at 224° C.

EXAMPLE XVII

A vigorous reaction occurred when a mixture of 49 grams of tertiary butyl chloride and 59 grams of 1,2-dichloropropene-2 was contacted with 3 grams of substantially anhydrous aluminum chloride at −10° C. The temperature of the reaction mixture increased rapidly to +10° C. and the reaction was completed in less than 0.5 hour. From this run 60 grams of 1,2,2-trichloro-4,4-dimethylpentane was obtained which boiled at 202° C.

EXAMPLE XVIII

The condensation of tertiary butyl chloride (50 grams) with 1,2-dichloropropene-1 (60 grams) in the presence of aluminum chloride took place less readily than did the similar reaction involving tertiary butyl chloride and 1,2-dichloropropene-2. In the present run a 15% yield (16 grams) of 2,2,3-trichloro-4,4-dimethylpentane was obtained at a reaction temperature of between −20° and −10° C.

EXAMPLE XIX 40 grams of isopropyl chloride and 55 grams of 1,2-dichloropropene-2 upon being reacted at 10° C. in the presence of 3 grams of substantially anhydrous aluminum chloride yielded 14 grams of a trichlorohexane found to be 1,2,2-trichloro-4-methylpentane.

EXAMPLE XX

No condensation product was isolated from the reaction of ethyl chloride and cis-dichloroethylene in the presence of aluminum chloride at 20° C. Instead there was obtained a 30% yield of trichloroethane formed by the addition of hydrogen chloride (from the ethyl chloride) to the dichloroethylene.

Condensation did occur, however, when 25 grams of isopropyl chloride and 25 grams of cis-dichloroethylene were reacted at 0° to 30° C. in the presence of 2 grams of aluminum chloride. Trichloropentane boiling at 173–174° C. was thus obtained in 55% of the theoretical yield. In a similar run, 22% of the theoretical yield of trichloropentane was obtained by reacting 31 grams of isopropyl chloride and 40 grams of trans-dichloroethylene in the presence of aluminum chloride.

EXAMPLE XXI

A 37% yield of trichloropentane boiling at 174° C. to 175° C. was obtained by reacting 45 grams of normal propyl chloride and 50 grams of dichloroethylene (mainly the cis isomer) at a temperature of 0° to 15° C. in the presence of 6 grams of substantially anhydrous aluminum chloride. The trichloropentane so obtained had the same boiling point and refractive index as did that obtained by condensing isopropyl chloride with dichloroethylene. That the two products were identical was confirmed by the fact that their infra-red spectra were the same.

EXAMPLE XXII

A mixture of 40 grams of trichloroethylene and 25 grams of isopropyl chloride was cooled in a cylindrical glass reactor to −70° C. and then 1 gram of resublimed aluminum chloride was added thereto. The reaction mixture was mixed by shaking and permitted to warm slowly to 20° C. at about which it was maintained for 13 minutes. The reaction mixture was then cooled to −70° C. and 1 gram of fresh aluminum chloride was added thereto. The temperature of the reaction mixture during the reaction is shown in Table 5.

TABLE 5

| Time, Min. | Temp., °C. | |
|---|---|---|
| 0 | −70 | 1 g. of aluminum chloride added. |
| 7 | −29 | Clear, pale orange solution. |
| 11 | −10 | |
| 12 | 0 | |
| 13 | +20 | |
| 14 | 24 | Clear orange. Bubbles of hydrogen chloride evolved. Cooled to 15° C. |
| 17 | 18 | |
| 19 | 16 | |
| 21 | 18 | Cooled to 4° C. |
| 24 | 18 | |
| 26 | 20 | Cooled to −70° C. Sample showed one third of product boiled at 180–183° C. Added 1 g. fresh aluminum chloride. |
| 55 | −40 | |
| 61 | − 8 | No change. |
| 62 | 0 | Hydrogen chloride evolved. Cooled to −25° C. |
| 67 | − 8 | |
| 69 | −12 | |

The resultant reaction mixture was maintained at a temperature of −10° to 0° C. for 1 hour more during which hydrogen chloride was evolved gradually in the form of fine bubbles. Then the dark, reddish-brown upper layer (58 grams) was decanted from the catalyst sludge (5.5 grams) and was washed, dried, and distilled into fractions with the properties shown in Table 6.

TABLE 6

*Reaction product obtained from trichloroethylene and isopropyl chloride*

[Charge: 37 cc. or 49 g.]

| Fraction No. | B. P., °C. | Press. Mm. | B. P. at 760 mm. | Vol., cc. | $n_D^{20}$ |
|---|---|---|---|---|---|
| A | <30 | 8 | <150 | 3.6 | 1.4619 |
| 1 | 37–41 | 8 | 156–161 | 5.7 | 1.4790 |
| 2 | 41–60 | 8 | 161–182 | 5.3 | 1.4802 |
| 3 | 61–66 | 8 | 182–190 | 3.2 | 1.4846 |
| 4 | 47–47 | 4 | 184–184 | 13.1 | 1.4860 |
| 5 | 47–48 | 4 | 184–185 | 3.0 | 1.4860 |
| Residue | | | | 1.2 | |

Redistillation at reduced pressure of 11.8 cc. (15.5 grams) of the material contained in the above indicated fractions 4 and 5 (boiling point 47–48 at 4 mm. pressure) separated therefrom 9.4 cc. of 1,1,1,2-tetrachloro-4-methylbutane which boiled at 53–54° C. at 5.0 mm. pressure (185–186° at 760 mm.) and had a refractive index of 1.4860 at 20° C.

Fraction 1 of the products shown in the above table on redistillation boiled mainly at 45° C. at 15 mm. (152° C. at 760 mm.) and consisted of trichloropentene formed by a loss of hydrogen chloride from the tetrachloro-4-methylbutane.

The foregoing specification and examples illustrate the novelty and utility of the present process, although neither section is introduced with the intention of unduly limiting its generally broad scope.

I claim as my invention:

1. A process for producing a polyhalo-alkane which comprises reacting in the presence of a Friedel-Crafts metal halide catalyst a monohalo-alkane having at least 3 carbon atoms per molecule and containing a halogen of at least 35 atomic weight with a halomono-olefin containing a halogen of at least 35 atomic weight.

2. A process for producing a dihalo-alkane which comprises condensing a monohalo-alkane having at least 3 carbon atoms per molecule and containing a halogen of at least 35 atomic weight with a monohalomono-olefin containing a halogen of at least 35 atomic weight in the presence of a Friedel-Crafts metal halide catalyst.

3. A process for producing a polyhalo-alkane which comprises condensing a monohalo-alkane having at least 3 carbon atoms per molecule and containing a halogen of at least 35 atomic weight with a polyhalomono-olefin containing halogens of at least 35 atomic weight in the presence of a Friedel-Crafts metal halide catalyst.

4. A process for producing a trihalo-alkane which comprises condensing a monohalo-alkane having at least 3 carbon atoms per molecule and containing a halogen of at least 35 atomic weight with a dihalomono-olefin containing halogens of at least 35 atomic weight in the presence of a Friedel-Crafts metal halide catalyst.

5. A process for producing a polyhalo-alkane which comprises condensing a monohalo-alkane having at least 3 carbon atoms per molecule and containing a halogen of at least 35 atomic weight with a halomono-olefin containing a halogen of at least 35 atomic weight at a temperature of from about −40° to about 100° C. in the presence of a Friedel-Crafts metal halide catalyst.

6. A process for producing a dihalo-alkane which comprises condensing a monohalo-alkane having at least 3 carbon atoms per molecule and containing a halogen of at least 35 atomic weight with a monohalomono-olefin containing a halogen of at least 35 atomic weight at a temperature of from about −40° to about 100° C. in the presence of a Friedel-Crafts metal halide catalyst.

7. A process for producing a polyhalo-alkane which comprises condensing a monohalo-alkane having at least 3 carbon atoms per molecule and containing a halogen of at least 35 atomic weight with a polyhalomono-olefin containing a halogen of at least 35 atomic weight at a temperature of from about −40° to about 100° C. in the presence of a Friedel-Crafts metal halide catalyst.

8. A process for producing a trihalo-alkane which comprises condensing a monohalo-alkane having at least 3 carbon atoms per molecule and containing a halogen of at least 35 atomic weight with a dihalomono-olefin containing a halogen of at least 35 atomic weight at a temperature of from about −40° to about 100° C. in the presence of a Friedel-Crafts metal halide catalyst.

9. A process for producing a polychloro-alkane which comprises condensing a monochloro-alkane having at least 3 carbon atoms per molecule with a chloromono-olefin at a temperature of from about −40° to about 100° C. in the presence of a Friedel-Crafts metal halide catalyst.

10. A process for producing a polybromo-alkane which comprises condensing a monobromo-alkane having at least 3 carbon atoms per molecule with a bromomono-olefin at a temperature of from about −40° to about 100° C. in the presence of a Friedel-Crafts metal halide catalyst.

11. A process for producing a polyiodo-alkane which comprises condensing a monoiodo-alkane having at least 3 carbon atoms per molecule with an iodomono-olefin at a temperature of from about −40° to about 100° C. in the presence of a Friedel-Crafts metal halide catalyst.

12. A process for producing a dichloro-alkane which comprises condensing a monochloro-alkane having at least 3 carbon atoms per molecule with a monochloromono-olefin at a temperature of from about −40° to about 100° C. in the presence of a Friedel-Crafts metal halide catalyst.

13. A process for producing a dibromo-alkane which comprises condensing a monobromo-alkane having at least 3 carbon atoms per molecule with a monobromomono-olefin at a temperature of from about −40° to about 100° C. in the presence of a Friedel-Crafts metal halide catalyst.

14. A process for producing a di-iodo-alkane which comprises condensing a monoiodo-alkane having at least 3 carbon atoms per molecule with a monoiodomono-olefin at a temperature of from about −40° to about 100° C. in the presence of a Friedel-Crafts metal halide catalyst.

15. A process for producing a dichloro-alkane having from 5 to 9 carbon atoms per molecule which comprises condensing a mono-chloro-alkane having from 3 to 5 carbon atoms per molecule with a monochloromono-olefin having from 2 to 4 carbon atoms per molecule at a temperature of from about −40° to about 100° C. in the presence of a Friedel-Crafts metal halide catalyst.

16. A process for producing a dichloro-alkane having from 6 to 8 carbon atoms per molecule which comprises condensing tertiary butyl chloride and a monochloromono-olefin having from 2 to 4 carbon atoms per molecule at a temperature of from about −40° to about +40° C. in the presence of aluminum chloride.

17. A process for producing 1,1-dichloro-3,3-dimethylbutane which comprises condensing tertiary butyl chloride with vinyl chloride at a temperature of from about 0° to about 100° C. in the presence of a bismuth chloride catalyst.

18. A process for producing 2,2-dichloro-4,4-dimethylpentane which comprises condensing tertiary butyl chloride and 2-chloropropene at a temperature of from about −40° to about +40° C. in the presence of aluminum chloride.

19. A process for producing 1,1,2-trichloro-3,3-dimethylbutane which comprises condensing tertiary butyl chloride and cis-dichloroethylene in the presence of aluminum chloride.

20. A process for producing a polychloro-alkane which comprises reacting a tertiary monochloro-alkane with a chloromono-olefin in the presence of a Friedel-Crafts metal halide catalyst at a temperature of about −20° C. to about +100° C. to form a polychloro-alkane having a molecular weight equal to the sum of the molecular weights of said monochloro-alkane and said chloromono-olefin, and recovering said polychloro-alkane from the resultant products.

21. A process for producing a dichloro-alkane which comprises reacting a tertiary monochloro-alkane with a monochloromono-olefin in the presence of a Friedel-Crafts metal halide catalyst at a temperature of about −20° C. to about +50° C. to form a dichloro-alkane having a molecular weight equal to the sum of the molecular weights of said monochloro-alkane and said monochloromono-olefin, and recovering said dichloro-alkane from the resultant products.

22. A process for producing a polyhalo-alkane which comprises reacting a tertiary monohalo-alkane containing a halogen of at least 35 atomic weight with a halomono-olefin containing a halogen of at least 35 atomic weight in the presence of a Friedel-Crafts metal halide catalyst at a temperature of from about −40° C. to about 100° C. to form a polyhalo-alkane having a molecular weight equal to the sum of the molecular weights of said tertiary monohalo-alkane and said halomono-olefin, and recovering said polyhalo-alkane from the resultant products.

LOUIS SCHMERLING.

REFERENCES CITED

The following references are of record in the file of this patent:

UNITED STATES PATENTS

| Number | Name | Date |
| --- | --- | --- |
| 2,068,772 | Sixt | Jan. 26, 1937 |
| 2,297,564 | Kirkbride | Sept. 29, 1942 |

FOREIGN PATENTS

| Number | Country | Date |
| --- | --- | --- |
| 261,689 | Germany | July 2, 1913 |
| 695,125 | France | Dec. 11, 1930 |
| 824,909 | France | Feb. 18, 1938 |

OTHER REFERENCES

Beilstein, "Handbuch der Organischer Chemie," vol. I, page 150–1, 157–8; vol. I, First Supplement, page 58; vol. I, Second Supplement, page 113.

Henne, "Jour. Am. Chem. Soc.," vol. 60, pages 1697, 2491 (1938).

Simons, "Jour. Am. Chem. Soc.," vol. 60, pages 2596–7 (1938).

Simons, "Jour. Am. Chem. Soc.," vol. 65, pages 1269–71 (1943).

Simons, "Industrial and Engineering Chemistry," vol. 32, page 182 (1940).